United States Patent Office 3,163,577
Patented Dec. 29, 1964

3,163,577
BENZYL ALCOHOL STABILIZED IODINE-ALKALI IODIDE SOLUTIONS
Eduard Imhoff, Eichstrasse 28, Neuenhof, Switzerland
No Drawing. Filed Aug. 10, 1961, Ser. No. 130,471
Claims priority, application Switzerland, Aug. 11, 1960,
9,144/60
15 Claims. (Cl. 167—70)

This invention relates to a process for stabilizing aqueous solutions of iodine in alkali iodides.

It is already known that iodine will dissolve in considerable quantities in water in the presence of alkali iodides. By determinations of freezing point depression, Leblanc and Noyes have proved that all the iodine in such cases is chemically bound as polyiodide. Jakovkin was able to obtain for dilute solutions a good constant for the thermolytic dissociation of $KI_3$ into $KI + I_2$ from which the presence of anions $I_3'$ must be concluded. Dawsen and Gawler, and also Dawsen and Goodsen were able to detect the existence of higher alkali polyiodides in more concentrated aqueous solutions, thus the enneaiodides ($I_9'$) of lithium, sodium, potassium, ammonium, rubidinium and caesium.

The following equations hold good for these reactions:

$$I' + I_2 \rightleftharpoons I_3'$$
$$I_3' + I_2 \rightleftharpoons I_5'$$
$$I_5' + I_2 \rightleftharpoons I_7'$$
$$I_7' + I_2 \rightleftharpoons I_9'$$

or, generally:

$$I' + nI_2 \rightleftharpoons I_{2n+1}$$

in which $n$ has one of the values 1 to 4.

For certain medicinal purposes it is desired to store stable solutions with an invariable iodine content of 1%, 2%, 4% or 6% and an alkali iodide content of 2%, 4%, 8% or 12% in ampoules or rubber stoppered vials. It has been found however in the case of such solutions that after a relatively short storage period there occurs under the influence of heat, such as described above as thermolytic dissociation, and also after part of the contents have been withdrawn, a displacement to the left of the unstable equilibrium given above as applying to such solutions. Iodine separates and a loss of iodine occurs which is titrimetrically detectable and in some cases considerable.

The loss of iodine is dependent on the iodine-iodide concentration in the solution, on the temperature and on the nature of the storage vessel. Thus for example with a solution containing 2% of I and 4% of NaI, the iodine loss is 2.3% after storage for three months at 20° C. in a glass flask closed with a glass stopper and after twice withdrawing partial amounts of the contents.

When such a solution is stored in a commercial rubber stoppered vial, the iodine loss varies between 12.2% and 23.7% according to the nature of the rubber caps used.

We have now found that the unstable equilibrium of aqueous solutions of iodine in alkali iodides can be stabilized and/or the reactions can increasingly be displaced to the right as desired, by adding to the freshly prepared aqueous iodine-alkali iodide solution a small amount, for example 0.5 to 2.9% of an organic compound in which the polyiodide ions formed upon dissolving iodine in water in the presence of alkali iodide easier remain in the ionized state than they do in pure water.

Thus adding benzyl alcohol in a concentration of 0.5 to 2.9% effects a noteworthy improvement in the stability and consequently a significant decrease in the iodine loss. It is preferred to use lithium, sodium, potassium or ammonium iodide as the alkali iodide. Other iodides may however also be used.

The following example will further illustrate the invention but is not intended to limit it.

*Example*

4 grams of iodine and 8 grams of sodium iodide are dissolved in water in the usual way. When the process is completed, benzyl alcohol is added to the solution to a concentration of 2% and vigorously and thoroughly mixed; some of the polyiodide ions formed during the dissolution of the iodine in water in the presence of sodium iodide pass into the benzyl alcohol. A solution prepared in this way is characterized by a considerable improvement in stability as compared with a normal aqueous control solution of the same concentration.

Small amounts of other organic compounds, for example benzene or nitrobenzene, may be used for stabilization instead of benzyl alcohol.

I claim:

1. Process for the stabilization of aqueous solutions of iodine-alkali iodide comprising adding to such a solution a small amount of an organic compound selected from the group consisting of benzyl alcohol, benzene and nitrobenzene.

2. Process for the stabilization of aqueous solutions of iodine-alkali iodide comprising adding to such a solution benzyl alcohol in a concentration of from 0.5 to 2.9%.

3. Process for the stabilization of an aqueous solution of iodine in sodium iodide comprising adding thereto benzyl alcohol in a concentration of 2%.

4. Process for stabilizing a solution prepared by dissolving iodine in water in the presence of an alkali iodide selected from the group consisting of lithium iodide, sodium iodide, potassium iodide and ammonium iodide, comprising adding to the solution a small amount of an organic compound selected from the group consisting of benzyl alcohol, benzene and nitrobenzene.

5. An aqueous solution of iodine in water prepared in the presence of sodium iodide and also containing benzyl alcohol in a concentration of 2%.

6. An aqueous solution consisting essentially of water having dissolved therein iodine, at least one alkali iodide and a substance selected from the group consisting of benzyl alcohol, benzene and nitrobenzene in an amount sufficient to improve in said solution the retention of polyiodide ions in ionized state.

7. An aqueous solution consisting essentially of water having dissolved therein iodine, at least one alkali iodide and between 0.5% and 2.9% of a substance selected from the group consisting of benzyl alcohol, benzene and nitrobenzene.

8. An aqueous solution consisting essentially of water having dissolved therein iodine, at least one alkali iodide and between 0.5% and 2.9% of benzyl alcohol.

9. Process for forming a stabilized aqueous solution of iodine-alkali iodide, comprising the steps of dissolving iodine and alkali iodide in water so as to form a polyiodide ions-containing aqueous solution; and adding to the thus formed solution a substance selected from the group consisting of benzyl alcohol, benzene and nitrobenzene so as to improve the retention of polyiodide ions in ionized state.

10. Process for forming a stabilized aqueous solution of iodine-alkali iodide, comprising the steps of dissolving iodine and alkali iodide in water so as to form a polyiodide ions-containing aqueous solution; and adding to the thus formed solution benzyl alcohol so as to improve the retention of polyiodide ions in ionized state.

11. Process for forming a stabilized aqueous solution of iodine-alkali iodide, comprising the steps of dissolving iodine and alkali iodide in water so as to form a polyiodide ions-containing aqueous solution; and adding to the thus formed solution benzene so as to improve the the retention of polyiodide ions in ionized state.

12. Process for forming a stabilized aqueous solution of iodine-alkali iodide, comprising the steps of dissolving iodine and alkali iodide in water so as to form a polyiodide ions-containing aqueous solution; and adding to the thus formed solution nitrobenzene so as to improve the retention of polyiodide ions in ionized state.

13. Process for forming a stabilized aqueous solution of iodine-alkali iodide, comprising the steps of dissolving iodine and alkali iodide in water so as to form a polyiodide ions-containing aqueous solution; and adding to the thus formed solution between 0.5% and 2.9% of a substance selected from the group consisting of benzyl alcohol, benzene and nitrobenzene so as to improve the retention of polyiodide ions in ionized state.

14. An aqueous solution consisting essentially of water having dissolved therein iodine, at least one alkali iodide and between 0.5% and 2.9% of benzene.

15. An aqueous solution consisting essentially of water having dissolved therein iodine, at least one alkali iodide and between 0.5% and 2.9% of nitrobenzene.

References Cited in the file of this patent

Remington's Practice of Pharmacy, 1956, 11th edition, p. 567.